Dec. 2, 1969 R. M. CHASE 3,482,045

AUTOMATIC TELEPHONE ALARM WITH VOICE MESSAGE TRANSMITTED UPON LINE POLARITY REVERSAL

Filed Aug. 2, 1966 2 Sheets-Sheet 1

INVENTOR.
RONALD M. CHASE
BY Forrest J. Lilly
ATTORNEY

AUTOMATIC TELEPHONE ALARM WITH VOICE MESSAGE TRANSMITTED UPON LINE POLARITY REVERSAL

Filed Aug. 2, 1966 2 Sheets-Sheet 2

INVENTOR.
RONALD M. CHASE
BY [signature]
ATTORNEY

United States Patent Office 3,482,045

Patented Dec. 2, 1969

3,482,045

AUTOMATIC TELEPHONE ALARM WITH VOICE MESSAGE TRANSMITTED UPON LINE POLARITY REVERSAL

Ronald M. Chase, Los Angeles, Calif., assignor of one-half to Howard Chase, Los Angeles, Calif.

Filed Aug. 2, 1966, Ser. No. 569,658

Int. Cl. H04m *11/04*

U.S. Cl. 179—5 10 Claims

ABSTRACT OF THE DISCLOSURE

At a subscriber's telephone station, a magnetic tape reproducer has dialing signals of an agency's telephone number recorded on one track, and a voice message recorded on another track. A network between the track pickups and the telephone lines includes a trigger switch. When the trigger switch is actuated by the event, the pickup amplifiers and the reproducer motor are connected to a power source, and relay means couples the dialing track amplifier to the telephone lines. Dialing pulses, in the form of breaks in a single frequency signal of fixed amplitude, cause the agency's telephone to be dialed. When the agency telephone is answered, the polarities of the lines reverse and relay means couple the voice message amplifier to the lines. When the agency telephone is hung up, the polarities of the lines again reverse and the network responds by disconnecting the power source from the pickup amplifiers and reproducer motor and the relay means are deenergized to decouple the amplifiers from the telephone lines.

This invention relates to alarm systems and, more particularly, to an improved alarm system which uses existing telephone lines to automatically dial and deliver to an appropriate governmental agency a voice message which reports an event requiring attention and correction.

More specifically, this invention relates to an improved automatic alarm system of the type which includes a tape recorder, e.g., at a residence, for use in dialing the telephone of the agency whose aid is needed, and, upon the agency's telephone being answered, transmitting a voice message asking for help. Such systems as heretofore known have portions located at the residence and at the agency. Before the agency telephone is hung up, the agency portion of the system is actuated to transmit a signal, to which the residence portion of the system responds to turn off the tape recorder.

Since such systems involve the need for the human element at the agency to shut off the tape recorder after the message is received, they have a built-in source of error. Should the person at the agency forget to operate the agency portion of the system before he hangs up, the residence portion of the system continues to operate, and will again dial the agency. Accordingly, even though help has been sent out, the agency telephone will have to be answered again for the same message. Thus, the system can tie up the agency telephone at times when other important messages should be received.

These prior art systems also duplicate equipment for different agencies which it may be necessary to notify for different events. Where different messages are to be transmitted to police and fire departments, each agency must be provided with separate equipment for transmitting respective terminating signals for turning off the residence portion of the system. As is apparent, such systems are unduly complex, with corresponding maintenance problems, and are expensive to manufacture.

It is an object of my invention to provide an automatic alarm system that overcomes the above and other disadvantages of the prior art.

It is another object of my invention to provide an automatic alarm system with only one set of equipment at a residence that is adapted to dial and give different voice messages to different agencies, which does not employ any equipment at an agency location, and which automatically ceases operation when an agency telephone is hung up.

A further object of my invention is to provide a unique automatic alarm system having a minimum number of component parts of simple design and rugged construction, and which is economical to produce and maintain.

The above and other objects and advantgaes of my invention will become apparent from the following description taken in conjunction with the accompanying drawings of an illustrative embodiment thereof, in which.

Figure 1:
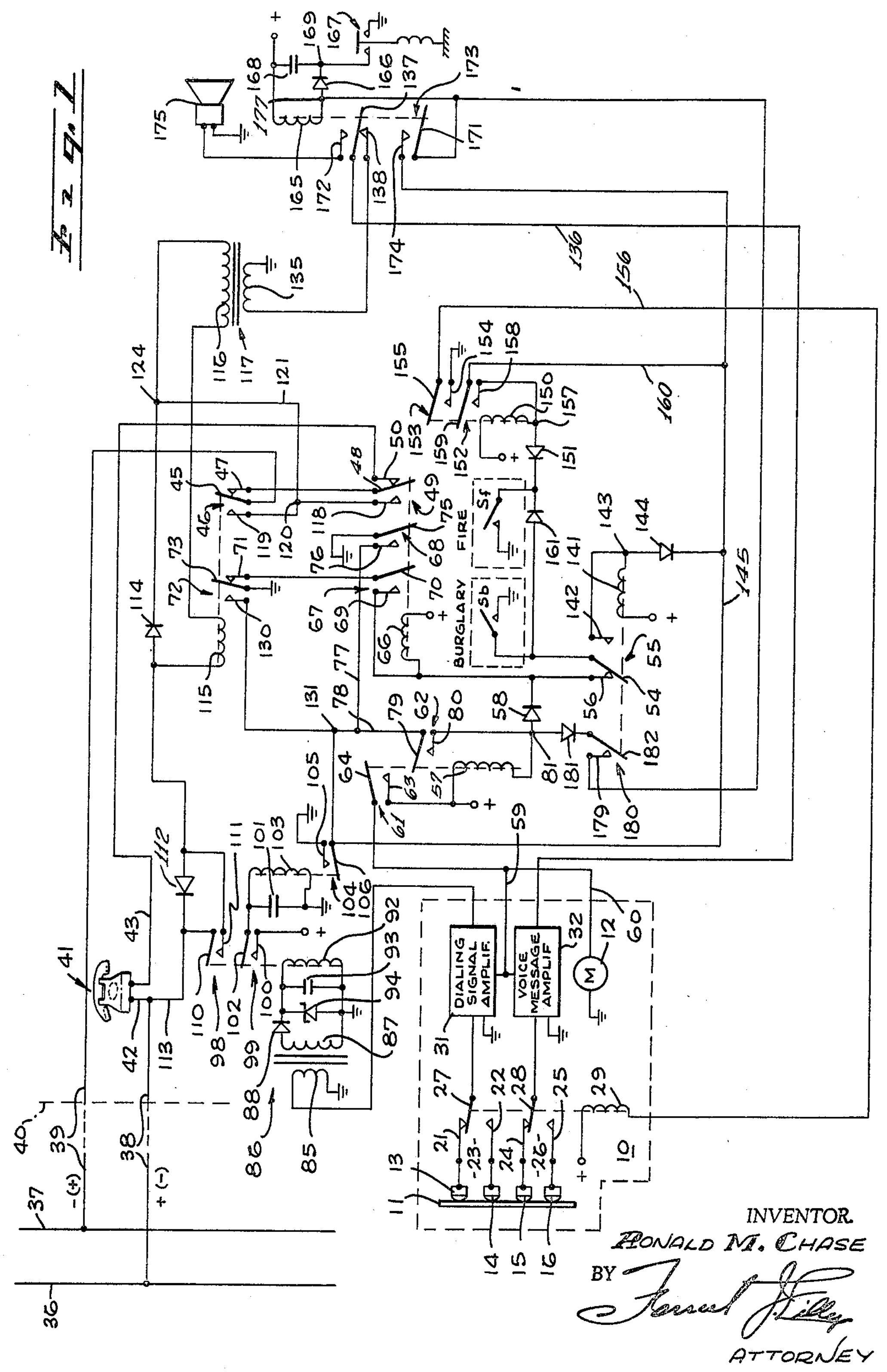
FIG. 1 is a schematic diagram of the alarm system of my invention, adapted for selectively automatically dialing the telephone numbers of different agencies and giving correspondingly different voice messages, and for automatically ceasing operation after the agency telephone is hung up.
Figure 2:
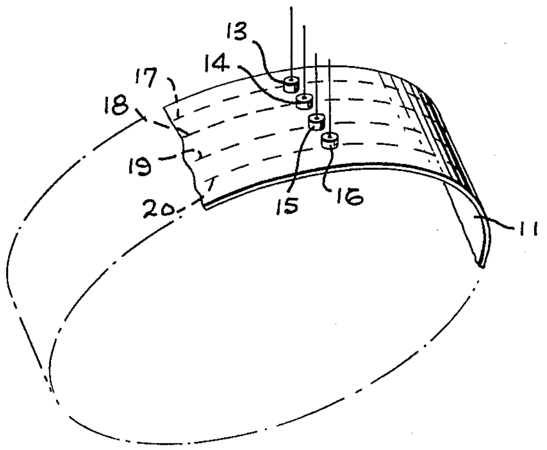
FIG. 2 is a perspective view of the endless loop magnetic tape used in the recorder illustrated in FIG. 1, showing magnetic pick-up heads adapted to pick up dialing pulses and voice messages pre-recorded on respective tracks of the tape.

Referring to FIGS. 1 and 2, a tape recorder 10 is illustrated in which an endless loop of tape 11 is adapted to be driven by a motor 12, and which is provided with magnetic pick-up heads 13–16 adapted to ride on respective tracks of the tape 11, as indicated at 17–20 in FIG. 2. As shown in FIG. 1, the heads 13, 14 are connected to respective fixed contacts 21, 22 of a single-pole, double-throw switch 23, and the heads 15, 16 are connected to respective fixed contacts 24, 25 of a similar switch 26. As shown, the movable contacts 27, 28 of these switches are connected for ganged operation, and their positions are controlled by a relay 29.

The movable contact 27 of the switch 23 is connected to the input of a dialing signal amplifier 31, and the movable contact 28 of the switch 26 is connected to the input of a voice message amplifier 32. The arrangement is such that when the relay 29 is not energized, the movable contacts 27, 28 engage the upper fixed contacts 21, 24. When the relay is energized, these movable contacts are moved into engagement with their other fixed contacts 22, 25.

The tracks on which the pick-up heads 13, 14 ride include pre-recorded signals in the form of pulse variations corresponding to the telephone numbers of respective governmental agencies, and the tracks on which the heads 15, 16 ride include voice messages for the attention of the respective agencies. For example, the track 17 on which the head 13 rides may have recorded thereon the telephone number of the police department, and the track 19 on which the head 15 rides may include a voice message indicating that a burglary is in process, e.g., "This is to report that a burglary is being committed at 2469 Halsted Street." In like manner, the track 18 on which the head 14 rides may include the pulsed signal recording for the telephone number of the fire department, and the track 20 on which the head 16 rides may include a voice message, e.g., "There is a fire at 2469 Halsted Street." A voice message may be repeated a number of times during the tape cycle.

My invention is adapted to selectively and automatically connect the outputs of the amplifiers 31, 32 to the existing telephone lines leading into the residence, dialing the appropriate agency, and delivering the pre-recorded voice message intended for that agency's attention. The main telephone lines are indicated at 36, 37 in the upper left-hand portion of FIG. 1, and conventional lead-in wires 38, 39 extend from the lines 36, 37 into the residence, indicated at 40. The telephone 41 in the residence 40 is connected for operation in the usual manner, i.e., with leads 42, 43 from the base of the telephone being connected to the lead-in wires 38, 39. However, with a slight modification of the wiring within the residence, I am able to connect both the telephone 41 and the alarm system of my invention for independent operation through the same lead-in wires. In this latter connection, one of the base leads 42 is connected to a lead-in wire 38 in the normal manner. The other lead-in wire 39 is connected to the remaining base lead 43 through a pair of serially connected, normally closed switches. For this purpose, the lead-in wire 39 is connected to the movable contact 45 of a single-pole, double-throw switch 46, such movable contact 45 normally being in engagement with a fixed contact 47 of said switch. The fixed contact 47 of the switch 46 is connected directly to the movable contact 48 of another single-pole, double-throw switch 49 wherein the movable contact 48 is normally in engagement with a fixed contact 50 to which the base lead 43 is directly connected. Unless and until an event occurs that requires the operation of my alarm system, the switches 46, 49 remain in the conditions shown, whereby the telephone 41 remains connected for operation in the usual manner.

For the conditions of a burglary and fire, I illustrate respective, normally open switches $S_b$ and $S_f$ which are adapted to be tripped upon the occurrence of a burglary or fire. In this connection, it will be understood that the switches $S_b$, $S_f$ may be part of conventional mechanisms employed for initiating an operation signifying the occurrence of a burglary or fire. For example, the switch $S_b$ may be a switch that is adapted to be closed upon the raising (opening) or breaking of a window, and the switch $S_f$ may be a bimetallic switch adapted to close in response to an increase in temperature caused by a fire in the vicinity thereof.

Let it be assumed that a burglary attempt is being made, and that the person attempting to enter the residence causes the switch $S_b$ to be closed. As shown, the fixed terminal of the switch $S_b$ is connected to ground, as is the negative terminal of the power supply (e.g., a battery, not shown), and its movable element is connected to the movable contact 54 of a single-pole, double-throw switch 55 in which the movable contact 54 is in engagement with one fixed contact 56. A relay has its coil 57 connected between the positive terminal of a power supply and the fixed contact 56, the coil 57 being connected to the fixed contact 56 through a forwardly directed diode 58. Thus, closing of the switch $S_b$ provides a completed D.C. path between the power supply terminals through the relay coil 57, the diode 58, the contacts 54, 56, and the switch $S_b$, thus energizing the relay 57.

As shown, the relay 57 is provided with a pair of switches 61, 62, in which the switch 61 has its fixed contact 63 connected to the positive terminal of the relay coil 57, and its movable contact 64 connected at 59 to the amplifiers 31, 32, and at 60 to the motor 12. Energizing the relay coil 57 causes its switch 61 to be closed, thereby connecting power to the amplifiers and to the motor.

The relay 57 is energized simultaneously with another relay which has its coil 66 connected between the positive terminal of the power supply and the fixed contact 56 of the switch 55. The relay 66 is provided with three switches, including the switch 49 previously mentioned, and two single-pole, single-throw switches 67, 68. The fixed contact 69 of the switch 67 is connected to the negative side of the relay coil 66, and the movable contact 70 of the switch 67 is connected to a fixed contact 71 of a single-pole, double-throw switch 72 in which the movable contact 73 is grounded and is normally in engagement with the fixed contact 71. Thus, when the relay 66 is energized, its switch 67 is closed, thereby providing a completed D.C. path to ground through the coil 66, its switch 67, and the contacts 71, 73 of the switch 72. Accordingly, if the switch $S_b$ should open after its initial closure, the relay 66 is kept energized.

The relay 57 also remains energized via its switch 62 and the switch 68 of the relay 66. As shown, the movable contact 75 of the switch 68 is connected to ground, and its fixed contact 76 is connected at 77, 78 to the movable contact 79 of the switch 62. The fixed contact 80 of the switch 62 is connected to the junction 81 of the relay coil 57 and the diode 58. Thus, when the relay 66 is energized to close the switch 68, a completed D.C. path to ground is also provided through the relay coil 57, its switch 62, and the switch 68.

With power thus applied to the motor 12 and the amplifiers 31, 32, the tape 11 is set into operation, and signals picked up by the heads 13, 15 from the associated tracks are applied to and amplified by the amplifiers. From the amplifier 31, signals from the dialing track are applied to the primary winding 85 of a step-up transformer 86, and the voltage across the secondary winding 87 of the transformer is rectified via a diode 88.

Figure 3:
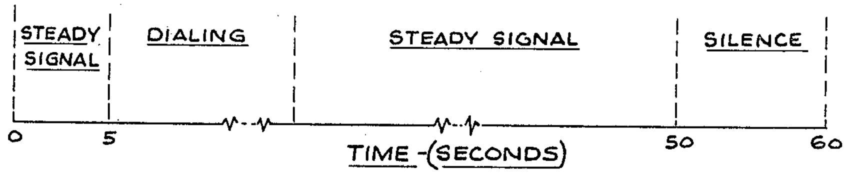
FIG. 3 is a time scale representation, for an endless loop tape cycle of 60 seconds, indicating the time durations and sequence allotted to steady signals, dialing and silence, for use in explaining the operation of the system of FIG. 1.
Figure 4:
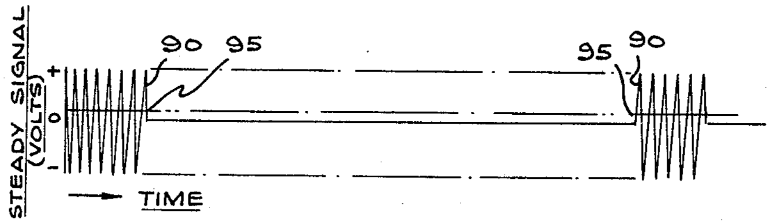
FIG. 4 is a graph showing the output voltage from the dialing signal amplifier during the steady tone periods indicated in FIG. 3.

Referring to FIGS. 3 and 4, the signal from the amplifier 31 during the first few seconds of movement of the tape 11 is a steady or unbroken signal which, as indicated at 90 in FIG. 4, is an alternating voltage of fixed amplitude and frequency. The frequency of the voltage preferably is well within the portion of the audio range of the components of the tape recorder 10 in which signals can be reproduced faithfully. In one example, I have that a signal of 1000 cycles per second is ideal in the use of a tape recorder of the compact type commonly employed in automobiles for playing music that has been pre-recorded on endless loop tape.

Figure 5:
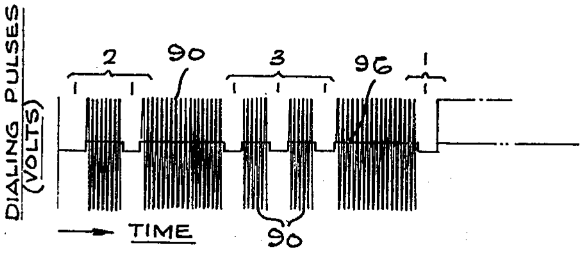
FIG. 5 is a graph of the output voltage from the dialing signal amplifier during the dialing phase indicated in FIG. 3.

At the end of the initial period of the steady signal, which may last, for example, for 5 seconds, dialing pulses recorded on the tape are applied to the transformer 86. Referring to FIG. 5, the dialing pulses are established in the form of breaks, or short periods of silence, which interrupt fixed frequency signal 90. If the number at the police station is, for example, 231–7649, the first digit of that number is signified (see FIG. 5) by two closely spaced breaks; following a predetermined period, three closely spaced breaks signify the second digit; and following the same predetermined period, a single break signifies the third digit of that number. It will me understood that the remaining digits of the number are established by corresponding numbers of breaks in the signal.

In operation, the signal from the transformer 86 is rectified and regulated to cause D.C. signals of fixed magnitude to be applied to a relay coil 92. As shown, a capacitor 93 and a regulator, shown as Zener diode 94, are connected to the rectifier 88, and also across the relay coil 92. The rectifier 88, capacitor 93 and Zener diode 94 function in a conventional manner to apply pure D.C. voltages across the relay coil 92. In this connection, and referring to FIGS. 4 and 5, the magnitude of the signal 90 may be, for example, of the order of 50 or 60 volts. However, the D.C. voltage applied to the relay coil 92, as indicated at 95 in FIGS. 4 and 5, is only a fraction of that magnitude, and preferably is selected or adjusted to that level of voltage required to energize the relay 92. Additionally, by thus clipping the rectified voltage, I insure that the voltage applied to the relay during the dialing period is substantially a square wave voltage, as indicated at 96 in FIG. 5. As will become apparent, such square wave insures the desired operation of the relay 92.

Immediately upon the steady signal 90 being established with operation of the tape recorder, the steady D.C. signals 95 applied to the relay 92 cause it to be energized, and hereby close a pair of normally open switches 98, 99. As shown, the fixed contact 100 of the switch 99 is connected to the positive terminal of the power supply, and a grounded capacitor 101 is connected to the movable contact 102 of that switch. A relay coil 103 is connected across the capacitor 101, and is adapted to close a normally open switch 104 which has its fixed contact 105 connected to ground.

When the relay coil 92 is energized to close the switch 99, the relay coil 103 is connected to the power supply, and is thus energized, thereby causing the movable contact 106 of the switch 104 to close against the fixed contact 105. Closure of the switch 99 also causes the capacitor 101 to be charged, and such charge is effective to prevent the relay 103 from dropping out during the dialing period.

In this latter connection, during the periods of interruption of the signal 90 for dialing, and hence during the periods when the square wave voltage 96 is zero, the relay coil 92 is de-energized. This means, of course, that the switches 98, 99 are undergoing frequent make and break operations during the dialing period, and thereby disconnecting the relay coil 103 from the power source while the switch 99 is open. However, I provide a capacitor 101 which has relatively large capacitance, e.g., of the order of 1000–2000 microfarads. During the initial steady period of the signal 90, such capacitor is charged. Thereafter, during the dialing phase, momentary opening of the switch 99 is not sufficient to discharge the capacitor. Rather, the capacitor substitutes as a voltage source, and the charge thereon is sufficient throughout the dialing phase to keep the relay coil 103 energized during the extremely short periods in which the square wave 96 is at zero volts.

The switch 98 is utilized for dialing the police station. As shown, the movable contact 110 and the fixed contact 111 of the switch 98 are connected across a diode 112 that is connected at 113 to the lead-in wire 38. Another diode 114 is connected back-to-back with the diode 112, and a relay coil 115 and the secondary winding 116 of a transformer 117 are connected in series across the diode 114.

At this point, it should be noted that when the relay 66 is energized immediately by closure of the switch $S_b$, the movable contact 48 of the switch 49 separates from the fixed contact 50, and is brought into engagement with the other fixed contact 118 of that switch. As shown, the fixed contact 118 is directly connected to the remaining fixed contact 119 of the switch 46, and their junction 120 is connected at 121 to the forward side of the diode 114, i.e., between the diode 114 and the secondary winding 116 of the transformer 117.

Thus, at the moment the switch $S_b$ closes, the lead 43 from the telephone base is disconnected from the lead-in wire 39. However, a connection is established between the lead-in wire 39 and the junction 124 between the diode 114 and the secondary winding 116, via the connection 121, the contacts 48, 118 of the switch 49, and the contacts 45, 47 of the switch 46.

As shown, the lead-in wire 38 is indicated as positive and parenthetically as negative and the lead-in wire 39 is indicated as negative and parenthetically as positive, to signify their polarities during dialing and while the telephone at the police station is being answered. When the relay 92 is first energized, i.e., during the initial period of the steady signal 90 (FIG. 4), a completed D.C. path to the telephone lines 36, 37 is traceable through the lead-in wire 38, the closed switch 98 around the diode 112, the diode 114, the connection 121, and the closed contacts 118, 48 and 47, 45 of the switch 46 to the lead-in wire 39. Such completed connection establishes the condition of a steady signal which, in the normal operation of a telephone, is heard as a steady tone when the receiver is lifted off the hook. During the dialing phase, this completed connection is broken during each instant that the square wave 96 (FIG. 5) reduces to zero volts. Like the breaking of the circuit when the conventional telephone is dialed, such circuit interruptions are processed through the central telephone station to dial the number of the telephone at the police station.

After the dialing phase (see FIGS. 2 and 3), the signal recorded on the track 17 is the same steady signal that existed before the dialing phase. This phase of the steady signal extends through most of the remainder of the track, terminating a few seconds, e.g., 10 seconds, before the end of the track cycle, and there is no signal present during these last remaining seconds. Thus, the recording on the track 17 in a one-minute track cycle may include 5 seconds of steady signal, 10 seconds of dialing, 35 seconds of steady signal, and 10 seconds of silence.

During the extended period of the steady signal following the dialing phase, it is expected that the telephone at the police station will be answered. As will be noted, the relay 92 remains energized during the existence of this steady signal, thereby maintaining the direct connection between the lead-in wires 38, 39. If the telephone at the police department is not answered by the end of the second period of the steady signal, the ensuing period of silence causes the relays 92, 103 to be de-energized. In this connection, the period of silence is sufficiently long to permit the capacitor 101 for the relay 103 to be completely discharged, so that the relay drops out. However, the relays 57, 66 remain energized, the motor 12 continues to operate the tape, and the amplifiers 31, 32 remain operative. Accordingly, the entire sequence is repeated until the telephone at the police station is answered.

Immediately upon the receiver of the telephone at the police station being lifted, the polarities of the lead-in wires 38, 39 automatically reverse, the lead-in wire 38 becoming negative and the lead-in wire 39 becoming positive, as indicated by the parenthetical symbols. When this occurs, the diode 112 is forward biased so as to be conductive, and the diode 114 is back biased so as to be nonconductive. The completed D.C. path is then traceable from the positive lead-in wire 39 through the closed contacts 45, 47 of the switch 46, the closed contacts 48, 118 of the switch 49, the connection 121, the secondary winding 116 of the transformer 117, the relay coil 115, the diode 112, and the connection 113 to the lead-in wire 38.

Establishment of this D.C. path results in the relay coil 115 being energized, whereupon the movable contact 45 of the switch 46 is brought into engagement with the fixed contact 119 thereof, and the movable contact 73 of the switch 72 is brought into engagement with its other fixed contact 130. As shown, the fixed contact 130 is connected to the movable contact 106 of the switch 104, and their junction 131 is tied to the connections 77, 78 previously described. Energization of the relay 115, to connect the contacts 45, 119 of the switch 46, retains the D.C. path, because the lead wire 39 and the connection 121 are now connected through the closed contacts 45, 119.

Simultaneously with energizing the relay 115, the voice message carried on the track 19 of the tape 11 (FIG. 2) is applied through the lead-in wires 38, 39 for transmission over the telephone lines 36, 37 to the police station. For this purpose, the output of the voice message amplifier is connected to the primary winding 135 of the transformer 117. As shown, the output of the amplifier 32 is connected at 136 through normally closed switch contacts 137, 138 to the primary winding 135.

It should be noted that signals from the dialing track 17 and the voice message track 19 are continuously being applied to the respective amplifiers 31, 32. Hence, signals from the dialing track 17 and from the voice message track 19 are simultaneously and continuously applied to the respective transformers 86, 117. However, with the foregoing description in mind, inspection of the circuit of FIG. 1 readily shows that, while the telephone at the police station is being dialed, the polarities of the lead-in wires 38, 39 do not permit signals from the voice message amplifier 32 to be applied to the telephone lines, but rather only the signals from the dialing signal amplifier are transmitted through the telephone lines. Further, and also because of the reverse polarities of the lead-in wires 38, 39, only the voice message signals from the amplifier 32 can be applied to the telephone lines when the telephone at the police station is answered.

At this point, it should be noted that when the relay 115 is energized, thereby to disconnect the movable contact 73 from the fixed contact 71, the self-holding connection for the relay 66 is broken. Accordingly, the relay 66 is de-energized, causing the movable contacts of its various switches to move to the positions shown in FIG. 1. However, the relay 57 remains energized, to keep power applied to the amplifiers 31, 32 and to the motor 12. For this purpose, whereas the relay 57 is initially energized, and kept energized, as a result of the energization of the relay 66, the holding circuit for the relay 57 is switched to the switch 72 of the relay 115. As will be noted, energizing the relay 115 brings the grounded movable contact 73 against the fixed contact 130, thereby maintaining a D.C. path from the positive terminal, through the relay coil 57, the switch 62, the connection 78 and the contacts 73, 130 to ground.

In this latter arrangement, the action of switching the movable contact 73 to the fixed contact 130 occurs before the relay 57 can de-energize to permit its switch 62 to open. Accordingly, the motor 12 continues to operate, and the voice message amplifier 32 continues to be connected to the transformer 117.

When the person answering the phone at the police station has received the message, his mere act of hanging up causes the alarm system to be deactivated, and the tape recorder 10 to be shut off. In this connection, it will be observed that when the telephone at the police station is hung up, the polarities of the lead-in wires 38, 39 again reverse, i.e., return to the polarities initially assumed herein. When this occurs, the relay 115 is de-energized, thereby causing the movable contact 73 to again engage the fixed contact 71. As for the D.C. path for the relay 57 that includes the switch contacts 73, 130, this operation breaks the connection.

However, it may be that at the instant the relay 115 is de-energized, the relay 103 is still energized. As will be apparent, the signal from the dialing track supplied through the amplifier 31 may be in the steady signal phase when the telephone at the police station is hung up, in which case the relay 103 is energized, and the capacitor 101 is charged, all as previously described. Thus, there is a compleed D.C. path through the switch 104, the connection 78, the switch 62, and the relay coil 57, which maintains the relay 57 energized while the relay 103 is energized.

If, as above stated, the relay 103 is energized at the instant the relay 115 is de-energized, power is still being applied to the motor 12 and amplifiers 31, 32, and the tape continues to run until the silence period of the dialing track is reached. Within the silence period, the relay 92 is de-energized, thus opening the switch 99, and the capacitor 101 discharges to cause the relay 103 to drop out. Thereupon the switch 104 opens, breaking the last possible connection for the relay 57 between the terminals of the power supply, thus de-energizing the relay and breaking the power connection to the motor 12 and the amplifiers 31, 32.

A further protective feature of my invention to insure that the systems ceases operation after the telephone at the police station is hung up includes means for disconnecting the switch $S_b$ from the remainder of the circuit. If the switch $S_b$ is one that is only momentarily closed upon the occurrence of the event for which help is sought, such momentary closure establishes the desired self-holding action of the relay 66. However, if the switch $S_b$ is one that remains closed when tripped, it will be seen that the entire sequence of events above described would be repeated and tie up the agency telephone. Accordingly, I provide a relay 141 which has its coil connected between the positive terminal of the power supply and the second fixed contact 142 of the switch 55. The junction 143 of the fixed contact 142 and the relay cail 141 is connected through a forwardly biased diode 144 to a connection 145 that leads to the movable contact 106 of the switch 104. When the relay 103 is initially energized, to close the switch 104, a completed D.C. path between the terminals of the power supply is established through the relay coil 141, the diode 144, and the switch 104. Such connection energizes the relay 141, thereby causing the movable contact 54 of the switch 55 to be brought into engagament with the fixed contact 142. This operation instantly establishes a completed D.C. path between the terminals of the power supply through the relay coil 141, the switch contacts 54, 142, and the switch $S_b$.

Accordingly, the relay 141 is self-holding as long as the switch $S_b$ is closed, and such self-holding action is not affected by subsequent de-energization of the relay 103. The relay 141 will remain connected to the power supply until the condition which caused the switch $S_b$ to close is corrected, e.g., resetting the switch if it is resettable, replacing a broken window which caused the switch to be closed, or taking such other corrective action as is necessary to re-establish an open switch $S_b$.

The fire sensing switch $S_f$ is adapted when closed to cause the relay 29 in the tape recorder 10 to be energized and switch the movable contacts 27, 28 of the switches 23, 26 to their associated fixed contacts 22, 25. As will be noted, this causes the signals on the dialing track 18 and the voice message track 20 to be picked up by the heads 14, 16 and applied to the associated amplifiers 31, 32. A relay 150 is connected between the positive terminal of the power supply and through a forwardly biased diode 151 to the movable contact of the switch $S_f$. Accordingly, when the switch $S_f$ is closed in response to a temperature increase caused by a fire, the relay 150 is connected between the terminals of the power supply, and is energized to close a pair of normally open switches 152, 153. Switch 153 has its fixed contact 154 connected to ground, and its movable contact 155 connected at 156 to the relay 29 of the tape recorder 10. Thus, when the relay 150 is energized, closure of its switch 153 causes the relay 29 in the tape recorder to be energized, to effect the switching above described.

The junction 157 of the relay coil 150 and the diode 151 is connected to the fixed contact 158 of the switch 152, and the movable contact 159 of that switch is connected at 160, 145 to the movable contact 106 of the switch 104. Thus, the relay 150 remains energized so long as the switch $S_f$ is closed, or so long as the switch 104 is closed (when its relay 103 is energized).

It will be noted that a diode 161 is connected in the forward direction between the movable contact 54 of the switch 55 and the movable contact of the switch $S_f$. Accordingly, closure of the switch $S_f$ completes a D.C. path between the terminals of the power supply through the relay 66, the contacts 54, 56 of the switch 55, the diode 161 and the switch $S_f$. Thereafter, the same sequence occurs as previously described in connection with closure of the switch $S_b$ except that the signals from the dialing track 18 are utilized to dial the number of the telephone of the fire department, and the signals from the voice message track 20 are processed to announce the occurrence of a fire.

The system of my invention also includes means for local checking or testing thereof. For this purpose, I provide a relay having a coil 165 connected between the positive terminal of the power supply and through a diode 166 to the floating fixed contact of a push-button switch 167 wherein its other fixed contact is connected to ground. A capacitor 168 is connected between the positive terminal and the junction 169 of the diode 166 and the floating fixed contact of switch 167.

Depressing the push-button switch 167 causes the relay 165 to be energized, and to actuate a pair of ganged movable contacts, which includes the movable contact 137 previously described, and a second movable contact 171. Energizing the relay 165 causes the movable contact 137 to be disengaged from the fixed contact 138, and brought into engagement with another fixed contact 172, and causes the movable contact 171, which is part of a normally open switch 173, to be closed against its fixed contact 174.

A loudspeaker 175 is connected to the fixed contact 172. Thus, energizing the relay 165 to close the contacts 137, 172 causes the loudspeaker 175 to be connected to the output of the voice message amplifier 32.

The junction 177 of the relay coil 165 and the diode 166 is connected to the movable contact 171 of the switch 173, and also to the fixed contact 179 of a normally closed switch 180. As shown, a diode 181 is connected between the movable contact 182 of the switch 180 and the junction 81 of the relay coil 57 and the diode 58. The diode 181, as shown, is connected in the forward direction between the junction 81 and the movable contact 182.

Depressing the push-button switch 167 establishes a D.C. path between the terminals of the power supply for the relay 57 that is traceable through the diode 181, the switch 180, the diode 166, and the push-button switch 167. Relays 57 and 165 are energized, and their associated switches 61, 62, 173 are closed. Closure of switch 173 allows the relay 141 to be energized, thus opening its switch 180. However, the relay 57 remains energized through the D.C. path traceable through: relay 57 and its closed switch 62; the connections from switch 62 to the junction 131, to the contact 106 of switch 104 and to the fixed contact 174 of switch 173; and through the closed switch 173, the diode 166 and the push-button switch 167. Accordingly, while the push-button 167 is depressed, power is supplied to the motor and amplifiers of the tape recorder 10, thereby to cause the voice message on the track 19 to be reproduced in the loudspeaker 175.

It should be noted that during the test procedure, signals from the dialing track are being applied to the transformer 86, thus causing the relays 92, 103 to be energized as previously described. Also, the switches 98, 99 are opened and closed as described for the dialing phase. However, since the relay 66 is not energized during the test procedure, signals from the dialing track are not reflected in the lead-in wires 38, 39, and hence cannot be transmitted to the telephone lines 36, 37.

From the foregoing, it will be apparent that various modifications can be made in the system of my invention as illustrated and described herein without departing from the spirit and scope of my invention. Accordingly, I do not intend that my invention be limited, except as by the appended claims.

I claim:

1. In combination, at a telephone subscriber station wherein the telephone lines are of predetermined opposite polarities prior to the called telephone at another station being answered and after such called telephone is hung up, and wherein such polarities are reversed while the called telephone is being answered, an alarm system comprising:

reproducer means at the subscriber station having magnetic tape with dialing signals and voice message signals recorded on respective tracks thereof, said dialing signals including portions representing the number of the telephone at the other station, said reproducer means including a respective pick-up and amplifier for each track and a motor for moving the tape past said pick-ups;

a trigger switch at the subscriber station to be tripped;

circuit means at the subscriber station and operable upon said trigger switch being tripped to connect said amplifiers and motor to a power source;

and a network at the subscriber station including:

means operable when said trigger switch is tripped to couple the dialing track amplifier to the lines to cause the telephone at the other station to be dialed;

and means operable when the dialed telephone is answered and the polarities of the lines reverse to couple the voice message amplifier to the lines to cause the voice message signals to be transmitted over the lines.

2. The combination of claim 1, wherein said network includes means operable when the answering telephone is hung up and the polarities of the lines return to said predetermined opposite polarities to operate said coupling means so as to decouple said amplifiers from said lines.

3. The combination of claim 2, further including:

means operable to disconnect said trigger switch from said circuit means after said amplifiers and motor are connected to the power source;

and means in said network interconnected with said disconnect means to keep said amplifiers and motor connected to the power source until the called telephone is hung up.

4. In combination, at a telephone subscriber station, wherein the subscriber telephone has a base with a pair of leads for connection to telephone lines, such lines being characterized in that they are of predetermined opposite polarities except during periods when a dialed telephone is answered, and in that during such periods the polarities are reversed, an alarm system for dialing another telephone and providing a voice message advising the occurrence of an event for which help is needed, comprising:

a trigger switch to be tripped upon the occurrence of the event;

recording media having pre-recorded signals representing the number of the other telephone, and a pre-recorded voice message to be transmitted when the other telephone is answered, including:

a tape recorder having an endless loop of magnetic tape, said signals and voice message being recorded on respective tracks thereof, a respective magnetic pick-up head engaging the tape at each track, a respective amplifier connected to each pick-up head, a motor for moving the tape past said pick-up heads;

means for connecting said amplifiers and said motor to a source of power upon said trigger switch being tripped;

a pair of lead-in wires for connecting the base leads to the lines, one lead-in wire connected directly to one base lead;

telephone disconnect means normally connecting the other lead-in wire to the other base lead, and disconnecting said lead-in wire from said other base lead when said trigger switch is tripped;

means cooperable with said disconnect means to establish a conductive connection between said lead-in wires when said trigger switch is tripped, said cooperable means being coupled to the amplifier associated with the track on which said signals are recorded and responsive to said signals to interrupt said conductive connection so as to cause the other telephone to be dialed, said cooperable means being operable in response to said signals until the other telephone is answered and the polarities of the telephone lines are reversed;

means operable while the polarities of the telephone lines are reversed to couple the amplifier associated with the voice message track to said lead-in wires so as to transmit the voice message to the other telephone;

and means operable upon the other telephone being hung up and upon the attendant reversal of the line polarities to prevent the outputs of said amplifiers from being coupled to said lead-in wires.

5. The combination of claim 4, including an audio transformer having a primary winding coupled to the amplifier associated with the voice message track, said transformer having a secondary winding;

a pair of back-to-back diodes connected between said one lead-in wire and one end of said secondary winding, the other end of said secondary winding being connected to the junction of said diodes;

a normally open switch connected to said one lead-in wire and connected across one of said diodes;

a relay circuit in said cooperable means responsive to said signals to close said normally open switch and thereafter open it to interrupt the conductive connection between said lead-in wires for dialing the other telephone; and a switch network in said disconnect means connected between said other lead-in wire and said one end of the secondary winding, said diodes being so poled that during operation of said relay circuit for dialing there is a conductive path between said lead-in wires which bypasses said secondary winding through said switch network, and so that in the reversed polarities of the telephone lines there is a conductive path between said lead-in wires and through said switch network which includes said secondary winding.

6. The combination of claim 5, wherein said pre-recorded signals include an initial period of uninterrupted alternating signal of predetermined frequency and amplitude, a period of alternating signals of said frequency and amplitude which are spaced in accordance with the digits of the number of the other telephone, a further period of uninterrupted alternating signal of said frequency and amplitude, and a terminating period of silence, said relay circuit closing said normally open switch in the presence of said alternating signal and opening such switch in the absence of said alternating signal.

7. The combination of claim 6, wherein said means for connecting said amplifiers and motor to a source of power includes first and second relays adapted to be connected to a power source through said trigger switch and energized when said trigger switch is tripped;

a third relay adapted to be energized during the period of reversed polarities of the telephone lines; and interconnected switches for all of said relays to maintain said first and second relays energized after said trigger switch is tripped, switch connections between the first and third relays maintaining said first relay energized before said third relay is energized and causing said first relay to be de-energized when said third relay is energized, switch connections between said second and third relays maintaining said second relay energized while said third relay is energized and causing said second relay to be de-energized when said third relay is de-energized upon re-establishment of said predetermined polarities of the telephone lines.

8. The combination of claim 7, wherein said means for preventing further operation of said dialing means and message transmitting means includes a normally closed switch connection between said trigger switch and said first relay; and means opening said switch connection upon said trigger switch being tripped.

9. The combination of claim 8, wherein said tape has an additional pair of tracks containing, respectively, pre-recorded signals representing a second telephone number to be called, and a voice message of a different event for which help is needed;

respective pick-up heads engaging the tracks of said additional pair;

means to switch one of the amplifiers between the pick-up heads engaging the tracks containing the signals representing telephone numbers;

means to switch the other amplifier between the pick-up heads engaging the tracks on which the voice messages are recorded;

a second trigger switch to be tripped upon the occurrence of the different event; and means operable upon said second trigger switch being tripped to switch said amplifiers to the pick-up heads engaging the tracks containing the signals and voice message associated with the different event.

10. The combination of claim 8, including a test loudspeaker; means for disconnecting said transformer primary winding from and connecting said loudspeaker to the amplifier associated with the voice message track; and means to energize only the second relay to apply power to the amplifiers and motor.

References Cited

UNITED STATES PATENTS

| | | | |
|---|---|---|---|
| 3,188,392 | 6/1965 | Ferrell | 179—5 |
| 3,287,500 | 11/1966 | Moore | 179—5 |
| 3,327,060 | 6/1967 | Hogan | 179—5 |
| 3,369,079 | 2/1968 | Glidden | 179—5 |

ROBERT L. GRIFFIN, Primary Examiner

WILLIAM S. FROMMER, Assistant Examiner